United States Patent
Widstrom

(10) Patent No.: US 11,946,380 B2
(45) Date of Patent: Apr. 2, 2024

(54) AIRCRAFT ENGINE LUBRICANT CIRCULATION

(71) Applicant: GKN Aerospace Sweden AB, Trollhättan (SE)

(72) Inventor: Per Widstrom, Trollhättan (SE)

(73) Assignee: GKN Aerospace Sweden AB, Trollhättan (SE)

( * ) Notice: Subject to any disclaimer, the term of this patent is extended or adjusted under 35 U.S.C. 154(b) by 353 days.

(21) Appl. No.: 17/299,889

(22) PCT Filed: Dec. 19, 2019

(86) PCT No.: PCT/EP2019/086408
§ 371 (c)(1),
(2) Date: Jun. 4, 2021

(87) PCT Pub. No.: WO2020/127800
PCT Pub. Date: Jun. 25, 2020

(65) Prior Publication Data
US 2022/0025782 A1    Jan. 27, 2022

(30) Foreign Application Priority Data

Dec. 19, 2018    (GB) ...................................... 1820738

(51) Int. Cl.
*F01D 25/18*      (2006.01)
*F01D 25/12*      (2006.01)
*F16N 39/02*      (2006.01)
*F28D 21/00*      (2006.01)

(52) U.S. Cl.
CPC ........... *F01D 25/18* (2013.01); *F01D 25/125* (2013.01); *F16N 39/02* (2013.01); *F05D 2260/207* (2013.01); *F05D 2260/232* (2013.01); *F16N 2210/14* (2013.01); *F28D 2021/0021* (2013.01)

(58) Field of Classification Search
CPC ..... F16L 59/143; F16L 39/005; F16L 23/026; F16L 9/18; F01D 25/26; F01D 25/18; F28D 7/106; F28D 2021/0021; F16N 39/02; F16N 2210/14; F05D 2260/207; F05D 2260/232
USPC ........................................................ 184/6.22
See application file for complete search history.

(56) References Cited

U.S. PATENT DOCUMENTS

| 3,079,179 | A | * | 2/1963 | Niemoth | ................. | F16L 53/00 |
|---|---|---|---|---|---|---|
| | | | | | | 285/125.1 |
| 3,753,287 | A | * | 8/1973 | Ziemek | ................... | F16L 59/08 |
| | | | | | | 174/28 |
| 4,157,194 | A | * | 6/1979 | Takahashi | ............... | F16L 9/127 |
| | | | | | | 285/332 |
| 4,717,318 | A | * | 1/1988 | Elpern | ...................... | F01P 9/00 |
| | | | | | | 415/114 |

(Continued)

FOREIGN PATENT DOCUMENTS

EP    0186389 A1    7/1986

OTHER PUBLICATIONS

International Search Report and Written Opinion for PCT/EP2019/086408 dated Jun. 23, 2020 (18 pages).

*Primary Examiner* — Henry Y Liu
(74) *Attorney, Agent, or Firm* — Bejin Bieneman PLC

(57) ABSTRACT

An aircraft engine circulation system comprises a conduit arranged in use to communicate a lubricant to and from one or more bearings of an engine. The conduits define a space which comprises a material that is selected to change phase at a predetermined temperature.

19 Claims, 5 Drawing Sheets

(56) References Cited

U.S. PATENT DOCUMENTS

| | | | | |
|---|---|---|---|---|
| 4,784,586 A * | 11/1988 | Ho | | F01D 25/125 415/114 |
| 5,088,774 A * | 2/1992 | Spiegelman | | F16L 39/005 285/332 |
| 5,129,444 A * | 7/1992 | Bafford | | B22D 19/0072 164/112 |
| 7,189,065 B2 * | 3/2007 | Dudley | | F04B 39/06 417/313 |
| 8,596,959 B2 * | 12/2013 | Durocher | | F01D 9/065 415/110 |
| 8,967,237 B2 * | 3/2015 | Seryi | | B21D 39/04 285/123.3 |
| 9,181,838 B2 * | 11/2015 | Drews | | B01D 53/945 |
| 10,627,033 B2 * | 4/2020 | Sanchez | | F16L 39/005 |
| 2001/0023795 A1 * | 9/2001 | Sekine | | F16C 33/6674 184/5.1 |
| 2004/0197212 A1 * | 10/2004 | Roby | | F16C 33/10 417/407 |
| 2005/0212285 A1 * | 9/2005 | Haun | | F16L 39/005 285/123.1 |
| 2006/0061102 A1 * | 3/2006 | Wilkinson, III | | F16L 23/167 285/412 |
| 2007/0151255 A1 * | 7/2007 | Johnson | | F23R 3/286 60/776 |
| 2009/0218170 A1 * | 9/2009 | Hoffmann | | F01D 25/18 184/6.26 |
| 2010/0059988 A1 * | 3/2010 | Matsumoto | | F16L 23/0283 277/608 |
| 2012/0037148 A1 * | 2/2012 | Tudor | | F28D 20/02 126/400 |
| 2014/0116652 A1 * | 5/2014 | Ehinger | | F28D 15/0266 165/104.21 |
| 2014/0271118 A1 * | 9/2014 | Junod | | F02C 7/06 415/111 |
| 2015/0125264 A1 * | 5/2015 | Lighty | | F16N 7/385 415/111 |
| 2015/0130183 A1 * | 5/2015 | Statler, III | | B23P 11/005 228/101 |
| 2015/0219263 A1 * | 8/2015 | Nowak | | B23K 33/006 29/428 |
| 2015/0377065 A1 * | 12/2015 | Deane | | F01D 25/183 285/15 |
| 2015/0377080 A1 * | 12/2015 | Fortini | | F01K 23/065 60/671 |
| 2016/0010520 A1 * | 1/2016 | Will | | F01M 5/001 123/196 AB |
| 2017/0021385 A1 * | 1/2017 | Smith | | B05D 1/12 |
| 2018/0066781 A1 * | 3/2018 | Sanchez | | F28D 20/026 |
| 2018/0156118 A1 * | 6/2018 | Lighty | | F01D 25/125 |
| 2018/0363723 A1 * | 12/2018 | Heirendt | | F16J 15/56 |
| 2020/0271013 A1 * | 8/2020 | Zelesky | | F01D 11/003 |

* cited by examiner

AIRCRAFT ENGINE LUBRICANT CIRCULATION

CROSS-REFERENCE TO RELATED APPLICATIONS

This application is a national stage of, and claims priority to, Patent Cooperation Treaty Application No. PCT/EP2019/086408, filed on Dec. 19, 2019, which application claims priority to Great Britain Application No. GB 1820738.1, filed on Dec. 19, 2018, which applications are hereby incorporated herein by reference in their entireties.

BACKGROUND

Oil is used within an aircraft engine to act as a coolant for the multiple bearings that support the rotatable shafts within the engine. A typical aero-engine comprises a fan at an upstream end of the engine which is driven by a turbine, located downstream of the fan. The two are coupled together, for example through a gearbox, such that rotational power produced by the turbine drives the fan to create thrust.

The shaft which transmits the rotational torque is supported by a series of bearings which must be lubricated. It will be appreciated that owing to the temperatures within a gas turbine engine the lubricant must also be cooled. This is achieved by circulating the lubricant through a heat exchanger and returning it to the bearings. The circulation is achieved by means of an electrically powered pump or a pump mechanically coupled to the turbine.

In normal operation the pump circulates the lubricant which can satisfactorily lubricate the bearings whilst being adequately cooled by the heat exchanger(s).

Typically the lubricant is oil based and it has been established that failure to cool the oil can cause degradation of the oil to the extent that coking (where the oil is subjected to thermal breakdown leaving solid residues) can begin to occur within the lubricant circuit (the pipes conveying the lubricant). This presents two potential hazards.

First, coking over an extended period of time can restrict the flow path within the pipework carrying the lubricant as coking builds up on the surfaces of the pipes. This blockage may lead to starvation of the necessary lubricant flow to the bearing. Secondly, there is a danger that debris from the coking can break-free and be circulated around the coolant/lubricant path causing potential damage or blocking of pipes/oil spray injectors or the like.

In order to prevent these hazards the heat exchangers are arranged to sufficiently cool the lubricant to safe levels which prevent coking and in most circumstances this is adequate.

However, two further scenarios may lead to coking in spite of the heat exchanger cooling.

The first is operating an aircraft in extremely high temperatures where, for example, long taxiing is required. At taxi there are two contradicting requirements, low thrust to save brake consumption and also high power generation for customer needs as air conditioning and other cabin supplies. A common method to fulfil both these is to bleed off air flow from the compressor. This results in substantially higher core temperatures than for the ideal working gas turbine. This reduces cooling airflow and prevents the heat exchangers from cooling the lubricant.

One such example is operations at Johannesburg airport where operating temperatures can be high, in combination with high altitude resulting in abnormally high exit gas temperatures.

The second, and more severe issue, is at engine shut down. Because the pumps which circulate the oil based lubricant are powered by the engines themselves all lubricant circulation is halted when the rotor is stopped. This second problem is compounded by a shut-down at a location with high temperatures where the engine temperature can rise rapidly when the engine is shut-down. After the engine stops rotating (and consequently the oil circulation pump halts) the stored energy will be spread across the structure. At the same time the temperatures will asymptotically approach the ambient temperature. The hot part will be cooler until the outside temperature is met. However, the cold parts i.e., the oil wetted parts, will first experience an increase in temperature before the temperature begins to decline. This transient environment is dependent on multiple variables such as the proximity between parts, ambient temperatures, pilot behaviour, leakage within the structure, hot streaks, mission of flight amongst others.

A possible solution, not currently implemented, to the second problem is to use power from an aircraft's service turbine to circulate the lubricant and/or couple the aircraft to a ground based power source again to circulate the lubricant.

However, it is unclear if circulating the lubricant is sufficient since without a satisfactory airflow through the heat exchanger the lubricant temperature will begin to rise even if it is circulated.

The conventional solution to coking in the lubricant circuits is to monitor the state of the coolant path as part of the aircraft maintenance schedule and to replace the coolant pipework as it becomes coked. This is expensive, time consuming and exposes an aircraft to a situation where coking has not been correctly identified.

SUMMARY

The present disclosure is concerned with an improved and alternative approach to avoiding coking or debris build-up within oil lubrication circuits in gas turbines, with particular focus on aircraft engines.

Viewed from a first aspect, there is provided an aircraft engine circulation system comprising a conduit arranged in use to communicate a lubricant to and from one or more bearings, said conduit comprising a central tube defining a passage for communicating lubricant and a peripheral tube surrounding the central tube and defining a space between the outer surface of the central tube and the inner surface of the peripheral tube wherein the space contains a thermally induced phase changing material arranged in use to change phase when heated.

Typically, the turbine engine exit structure will operate in the region of 550° C. The lubricant oil is cooled to a temperature of approximately 120° C. before being recirculated. Without any circulation or cooling the oil temperature rapidly begins to increase.

Thus, a conventional conduit which is arranged to communicate a lubricant (and coolant) to and from the aircraft engine bearings, is augmented to delay the heat pick up from the structure to the conduit. Conventional arrangements create the delay by pure insulation material covered by a jacket or a double walled structure.

Systems and methods described herein enhance the heat capacity and thus the delay by means of an inner conduit for communicating or carrying the liquid coolant (for example oil) which is surrounded with an outer layer or jacket defining a space between the two. The space is then fully or partially filled with a material that changes phase in response to an increase in temperature.

It has been established that forming a lubricant circuit in this way provides a manner in which excess heat from an engine can be absorbed. Specifically, the heat that would conventionally have been conducted through the walls of a lubricant carrying pipe and directly to the lubricant (for example oil) is absorbed in changing the phase of the phase changing material. This heat absorption prevents heat being conducted or passed through the wall of the pipe and to the lubricant.

As described above excessive heating of the lubricant causes the lubricant (for example oil) to break down and convert to solid residue with the associated problems described above.

Such an arrangement thus allows an engine to be either shut-down in high temperatures and/or operate in high temperatures with low heat exchanger efficiency without overheating the lubricant oil. As set out above, this is achieved by selecting a material to surround the primary or central conduit which begins to change phase at a predetermined temperature. The phase change absorbs the unwanted heat energy from the hot engine by delaying the time for the oil wetted surface to converge to the asymptotic temperature curve for the total structure.

The term phase changing refers to the change in phase of a material from solid, to liquid, to gas. In the context of this disclosure the phase change material may be selected so that it only changes phase between solid and semi-solid/liquid. This advantageously avoids potential pressure increases within the system that may occur if a material changes through all three phases. Thus, advantageously the material may be selected to only change between solid and liquid (or a semi-solid/semi-liquid phase to state).

The phase changing material may be any suitable material according to the engine specifications and the type of oil (or other) lubricant which may be used. For example, if an engine requires a particular oil lubricant which is more susceptible to breakdown and coking, a phase changing material with high energy absorption characteristics may be selected. Conversely, if a more resilient oil is used, a material which changes phase at a lower temperature may be used.

Still further the thickness of the phase changing material as well as the material selection itself may be used in combination to optimise the heat absorption properties of the system.

It will be recognised from the teaching herein that the phase changing material will be selected so that it returns to a solid state below a predetermined temperature. During normal flight of the aircraft or over long periods of engine shut-down the phase changing material can cool, dissipate energy and return to a solid state ready to absorb energy in the next cycle.

The phase changing material may, in one example, be selected to change phase from solid state to liquid between 180° C. and 250° C. In another example the phase changing material may be arranged to change phase between 200° C. and 230° C. In a still further example, the phase changing material may be arranged to change phase at approximately 225° C.

It has been established that these temperature ranges are advantageous.

Specifically, it has been established that components subjected to temperatures above 227° C. (approximately 440° F.) are prone to oil degradation. More specifically degradation occurs at the surface of the oil where there is a boundary layer which is more intensely heated. In testing it has been established that that coking, for an in usage high grade aerospace lubrication oil, may start to coke at 250° C. (482° F.).

As stated above the material selected for the phase changing material may be any suitable material. This could be a suitable metal, as discussed above, or another phase shifting material such as an organic or inorganic phase changing material (PCM). Examples include but are not limited to organic and inorganic salts, inorganic eutectics, hydroscopic materials, hydrated salts, organic solutions and solid-solid materials.

For example, a suitable material is the H220 with the melting point at 220° C., density 2000 kg/m3 and phase shift energy 100 kJ/kg.

For example, it has been established that the H220 phase change material mentioned above may be conveniently used in the interstitial space between the central and peripheral tubes. The salts are not only convenient to use in manufacturing such a system but they are chemically stable (a safety requirement for aircraft engines) and also capable of absorbing the necessary energy to prevent break-down and damage to the lubricant.

For example, it has been established that phase shift materials with nominal transformation temperature at 220° C. may be advantageous. The technical benefit of the is illustrated by FIG. 7 which illustrates temperature against time after engine shut-down.

It has been also established that other materials may also be used depending on the thermal characteristics of the engine and oil. For example a metal may be used as the phase changing material, such as lithium or a similar metal, with a melting point at 180° C. Other options include lead, tin and silver alloys. It has been established that an estimation of the energy absorbed by a phase shifting material should be of the order of 10 kJ/m length of a typical 10 mm diameter tube. This is equivalent to approximately 3 kWh of energy.

In another arrangement the phase changing material may be a metal having a suitable phase changing temperature for the given aircraft engine application i.e. a phase changing (or melting) temperature at or around the predetermined temperature that may cause lubricant damage.

A particular issue is the encapsulation of the phase shift material without leaking. One promising method is to store the phase change material in spherical micro-balls.

A concern of using metals like tin (Sn) and lithium (Li) is the thermal conduction is high leading to unnecessary high heat transportation into the oil film.

In addition the density in these metals is relatively high, which is a disadvantage discouraging in weight sensitive applications such as for flying gas turbines. For stationary turbines the weight is a minor issue.

A combination of phase changing materials may be selected for different regions or lengths of the circuit so as to allow for optimisation of the heat absorbing properties of the circuit. For example some parts of the circuit may be hotter than others thus providing the potential for greater lubricant coking along certain portions of the circuit's length.

Turning to the separation between the inner and outer tubes (into which the phase changing material is positioned), the separation measured radially and defined between the outer surface of the central tube and the inner surface of the peripheral tube may be approximately constant along all or part of the length of the circuit.

Advantageously the radial separation of the outer surface of the central tube and the inner surface of the peripheral tube may be between 0.5 mm and 1.5 mm. More specifically the radial separation of the outer surface of the central tube and the inner surface of the peripheral tube is approximately 1 mm.

It has been established that the importance of these ranges is because the heat transfer is a result of one or more of 1) radiation, 2) conduction or 3) convection.

The following considerations have been established as important:

In the situation of an engine shut-down there is initially significant radiation, from the hot turbine vanes and casings towards the colder oil conduits. The heat is later transferred in the media (air) by convection, and within the metal by conduction to finally meet the oil wetted surface.

For air, an ideal gap may be approximately 20 mm (millimeters). This is impractical for aerospace dimensions, but as long there is a gap that is larger than the boundary layers, and no contact, then the air arrangement may function adequately.

Any means to delay or increase heat resistance will increase the time for the oil wetted surface to meet coking temperature. On the other hand any means to increase the cooling of the surrounding structure will decrease the time when the temperatures all-over are below coking point.

For the operating temperatures described above the coking scenario considerations are:

1) If the inner tube is protected from radiation then it will be shielded from direct radiation;
2) If a suitable gap between the protective heat shield and the inner layer is provided it is possible to prevent conduction within the proposed arrangement;
3) The gap is filled with phase changing material, preventing the heat transfer from external shield into the inner oil wetted inside (tube); and
4) If the arrangement is limited to convection (which in turn has a boundary resistance between each section between layers).

The radial separation of the two tubes may also be non-uniform along all or part of the length of the pipe. For example, the two tubes may be coaxial along the length of the circuit but have varying thicknesses of phase changing material surrounding the inner tube. Thus, different thermal conditions along the circuit can be provided for. More specifically the system can be optimised for heat absorption and minimum weight, an important consideration in engine design.

For example, the expected overheating conditions for an engine may be calculated or determined using modelling and the radial amount of phase changing material predetermined and applied to the circuit. Thus, a fully optimised cooling circuit for engine bearings can be provided with minimal additional weight to the engine.

In some regions it may be determined that no phase changing material is required i.e. there are minimum risks of coking in the lubricant circuit. In such regions or zones the thickness of the phase changing material may be zero. The transition between the changes in thickness of the phase changing material may, for example, be tapered (providing a tapered change in insulation properties) or stepped (providing a step-change in insulation properties).

The inner and outer tubes may be concentric with each other thereby providing the inner tube with a uniform and circumferentially extending phase changing material layer around its perimeter. Thus, the inner tube is protected uniformly from over-heating around its entire circumference.

The tubes may also be of the same cross-sectional shape, for example circular or oval. In other optional arrangements the inner or out tubes may be different shapes. For example, the inner tube may be circular and the outer oval. Selecting the respective shapes allows for different amounts of phase changing material to be positioned on different sides of the circuit to accommodate different thermal requirements.

Furthermore, the shapes and combination of shapes of the inner and outer tubes may change along the length of the circuit allowing for different thermal properties along the length of the circuit. Thus, zones where lower temperatures are experienced can be provided with thinner sections of phase changing material.

The tubes may be arranged concentrically with one another or may advantageously be non-concentric such that more phase changing material is located on a side of the tube that is hotter. The concentricity may further be adjusted along the length of the tube according to predetermined thermal conditions as a particular area within the engine. Additive manufacturing or extruding techniques may advantageously provide for such optimisation. Thus, the radiation that is focused on the sides/shortest distance to the outer diameter of the tube can be shielded.

The radial spacing and/or concentricity of the central and peripheral tubes may be selected according to the predicted and/or predetermined temperature of the tube in use along a specific length of the conduit during use. Thus, the system allows for full optimisation of the thermal absorbing properties not only along the length of the circuit but also circumferentially around the circuit. Heat absorption can be maximised and weight addition simultaneously minimised.

The system may be provided with a suitable heat exchanger arranged to receive coolant/lubricant, to cool it and return the coolant/lubricant to the circuit.

Viewed from another aspect there is provided a method of lubricating one or more bearings of an aircraft engine, the method comprising the step of causing a lubricant to be communicated through a heat exchanger and to one or more bearings in an aircraft engine through a lubricating circuit, wherein the lubricating circuit comprises a conduit arranged in use to communicate a lubricant to and from one or more of said bearings, said conduit comprising a central tube defining a passage for communicating lubricant and a peripheral tube surrounding the central tube and defining a space between the outer surface of the central tube and the inner surface of the peripheral tube wherein the space contains a thermally induced phase changing material arranged in use to change phase when heated.

In such an arrangement the circuit may be configured to return the lubricant from the one or more bearings to the heat exchanger to create a continuous circuit.

Viewed from yet another aspect there is provided a method of manufacturing a lubrication system for an aircraft engine comprising the steps of forming a conduit arranged in use to communicate a lubricant to and from one or more bearings wherein the conduit comprises a central tube defining a passage for communicating lubricant and a peripheral tube surrounding the central tube and defining a space between the outer surface of the central tube and the inner surface of the peripheral tube wherein the space if provided with a thermally induced phase changing material is arranged in use to change phase when heated.

The circuit may be formed of a plurality of discrete sections or lengths each connected together to allow for fluid communication along the inner tube. The sections may be formed using a variety of techniques. Advantageously, in one arrangement, the circuit or sections thereof may be formed using an additive manufacturing process. For example, laser deposition or other suitable techniques could be used to 3D print the circuit sections. This advantageously allows complex and precise internal geometries to be produced.

Any suitable additive manufacturing technique may be used including, but not limited to:
Powder bed fusion methods
Direct metal laser sintering (DMLS)
Electron beam melting (EBM)
Selective laser melting (SLM)
Selective laser sintering (SLS)
Direct metal wire deposition
Direct metal powder deposition Thus, tubes may be created as a total tube assembly for an integral solution.

Viewed from yet another aspect there is provided a lubrication arrangement for an aircraft engine comprising a multi-walled lubricant circuit arranged in use to convey lubricant to and from one or more bearings of an aircraft engine, wherein the lubricant circuit comprises an inner-wall defining a central conduit arranged in use to convey a lubricant and an outer-wall defining an outer surface of the circuit, wherein a radial space defined between the inner and out walls comprises a material dissimilar to the inner and outer wall materials.

In such an arrangement the dissimilar material may be a phase changing material which changes phase in response to a predetermined temperature as described herein.

It will be recognised from the teaching herein that there is provided a system which allows for an optimised heat absorption circuit to be provided which has the minimal weight addition to a conventional engine.

It follows that viewed from another aspect there is provided a method of manufacturing a cooling system for the bearings of an aircraft engine, comprising the steps of:
(a) Determining or predicting the expected operational temperature of internal regions of an aircraft engine through which a lubricant is to be communicated;
(b) Determining the required thickness of phase changing material needed to absorb the predicted temperatures; and
(c) Forming one or more sections of a lubricating circuit having phase changing material thickness around an inner tube corresponding to the predetermined thicknesses required at each engine region.

By constructing a heat 'map' of the given engine and establishing the zones where coking might occur it is possible, as described herein, to fully optimise the lubricant circuit to minimise the chance of coking occurring.

BRIEF SUMMARY OF THE DRAWINGS

Aspects of the disclosure will now be described, by way of example only, with reference to the accompanying figures in which.

Figure 1:
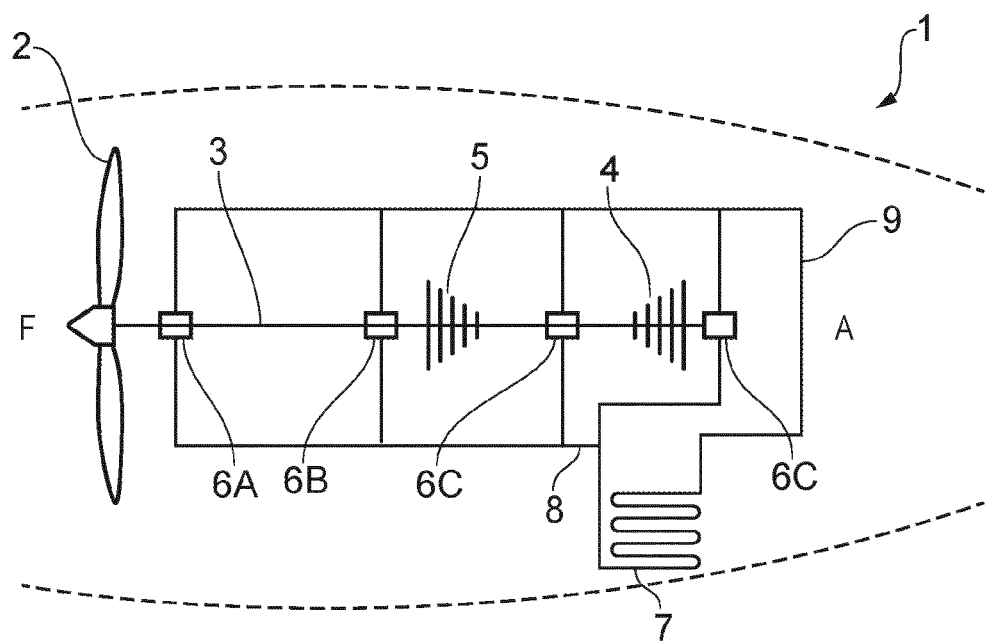
FIG. 1 shows a simplified schematic of the principal components of an aero-engine bearing support and lubrication circuit.

While the invention is susceptible to various modifications and alternative forms, specific embodiments are shown by way of example in the drawings and are herein described in detail. It should be understood however that the drawings and detailed description attached hereto are not intended to limit the invention to the particular form disclosed but rather the invention is to cover all modifications, equivalents and alternatives falling within the spirit and scope of the claimed invention.

It will be recognised that the features of the aspects of the invention(s) described herein can conveniently and interchangeably be used in any suitable combination.

DETAILED DESCRIPTION

FIG. 1 is a simplified schematic of the principal components of an aero-engine bearing support and lubrication circuit.

The engine 1 has an outer casing shown in dotted line. At the front of the engine (denoted by F for Front) a fan 2 is situated. The fan creates a proportion of the thrust which drives air towards the Aft (denoted by A) of the engine. As will be understood by the person skilled in the art of the operation of a gas turbine engine a central shaft 3 passes along the central axis of the engine 1. The shaft 3 couples the fan 2 to a turbine 4 located at the rear of the engine. In operation air is compressed by one or more compressors 5 and introduced into a combustor (not shown). The combustor ignites the compressed air with fuel which is directed to the turbine 4. Rotation of the turbine causes the fan to rotate which drives air towards the aft of the engine creating (in combination with the exhaust gas from the combustor) thrust to drive the aircraft forwards.

The central shaft 3 is rotationally mounted on a plurality of bearings 6A-6D which support the shaft and allow for rotational movement. The bearings operate at high speed and also high temperature owing to their position within the core of the engine which typically operate at 550° C. It is therefore necessary not only to provide a lubricant to the bearings to allow them to rotate but also to cool the lubricant.

A typical lubricant used in aircraft engines is an oil complying with SAE AS5780 manufactured by numerous oil manufacturers including BP, Exxon, Shell, Anderon and others.

The cooling circuit will now be described again with reference to the schematic shown in FIG. 1.

Each of the bearings 6A-6D is in fluid communication with a heat exchanger 7 by means of a supply conduit 8 and a return conduit 9. The flow paths shown in FIG. 1 are purely for illustration only and are shown merely to illustrate that each bearing is in fluid communication with the heat exchanger 7. The fluid is driven by a mechanical or electrical pump (not shown) which is driven either mechanically or electrically by the engine.

As described herein when the engine is switched off the circulation of the lubricant through the conduits 8, 9 stops and oil no longer moves through the heat exchanger which would ordinarily dissipate heat from the oil/lubricant. The oil then rapidly increases in temperature.

The coking problems discussed herein are caused by heating the oil lubricant to elevated temperatures which causes a chemical breakdown of the oil by oxidation and deposition of carbon on the hot surfaces of the inner wall of the conduits 8, 9. Specifically, the breakdown is a result of a chemical process with the influence of time, temperature, and presence of oxygen/air. For example, with the Arrhenius approach, the accumulated damage is the summed time at the damage exponential to the exposed temperature.

Figure 2:
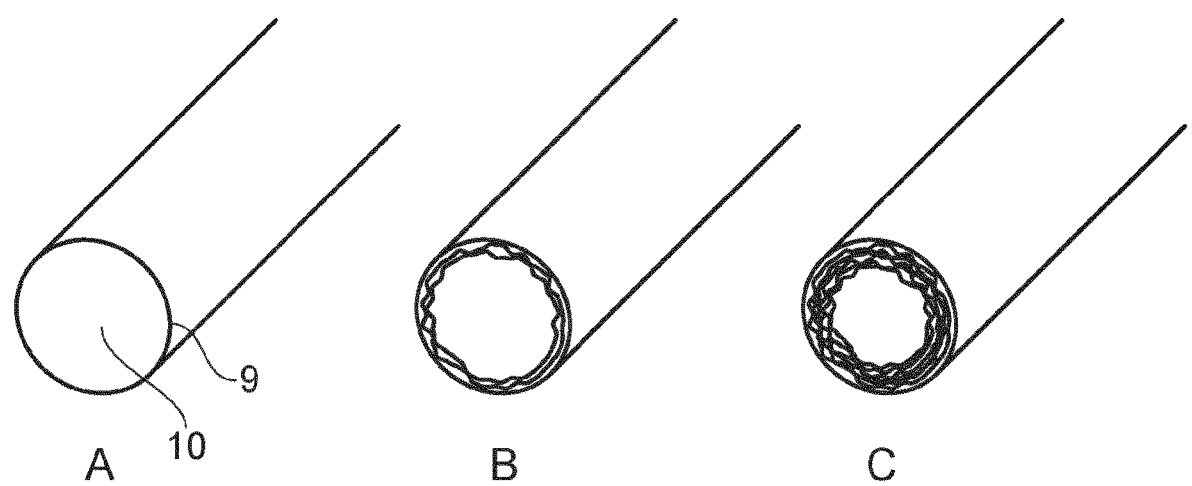
FIGS. 2A, 2B and 2C show the progressive build-up of carbon or coking within an oil tube.

Referring to FIGS. 2A, 2B and 2C the progressive build-up of carbon or coking is illustrated. Over time (time extending between 2A to 2C) the coking builds up on the inner surface of the tube 9 slowly increasing in thickness and thus reducing the inner flow path 10 of the tube 9.

Conventionally this problem is solved by cleaning and/or replacement of the tubes during scheduled or emergency maintenance.

Figure 3A:
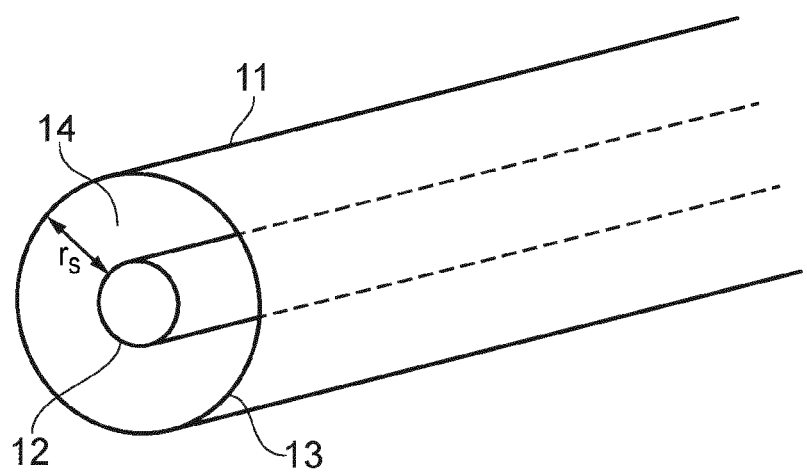
FIGS. 3A and 3B show a multi-layered pipe or tube according to an example.
Figure 3B:
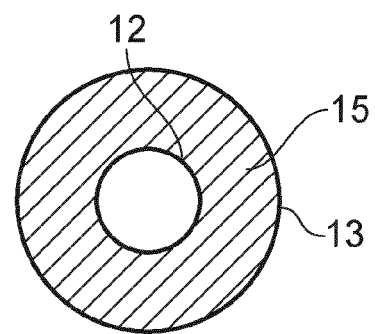

FIGS. 3A and 3B illustrate an example described herein.

Referring first to FIG. 3A a multi-layered pipe or tube 11 is shown that makes up all or part of the circulation path shown in FIG. 1. The pipe system comprising a central pipe 12 for communicating the oil. Surrounding the pipe 12 is a peripheral pipe 13 which in the example shown in FIG. 3A is concentric with the central pipe and spaced therefrom by a radial separation gap $r_s$.

Each tube may be formed of any suitable material such as a steel alloy. The radial separation between the inner and outer (peripheral) tubes defines a space 14 which surrounds the inner tube 12. It has been established that by filling all or part of this space 14 with a material which changes phase at a predetermined temperature the inner tube 12 (and its oil content) can be thermally shielded or insulated.

Specifically, by introducing a thermally induced phase changing material into the space 14 exterior heat (which would normally be conducted through the pipe to the oil) can be absorbed. The heat is absorbed in changing the material from a solid state to a semi-solid or liquid phase.

Taking one example, the phase changing material may be selected as an inorganic salt selected from the table below. It may similarly be lead, lithium, zinc, amongst others.

Alloys of tin and lithium mixtures are also feasible as the Lead-Tin ASTM Sn50 or the Tin-Lead L13701 having a melting temperature approximately at 200° C.

FIG. 3B shows a cross-section of the system circuit with the central tube 12, peripheral tube 13 and phase changing material 15 filling the void between the two tubes.

Figure 4:
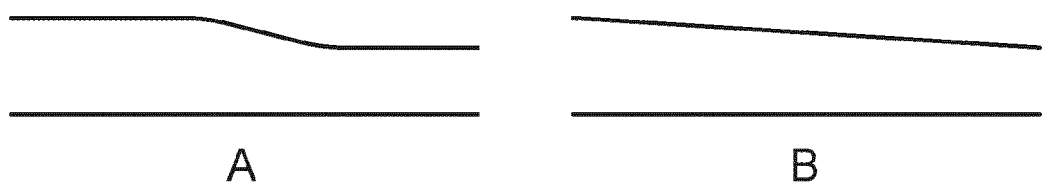
FIGS. 4A and 4B show how the profile of the circuit tubes may modified to include tapering and or a stepped section.

FIGS. 4A and 4B illustrate how the profile of the circuit tubes may modified to include tapering and or stepped sections. The radial separation of the inner oil carrying tube can be spaced from the heated sides of the tube accordingly providing flexibility in design according to the specific heating of a given zone or region of an engine.

Figure 5:
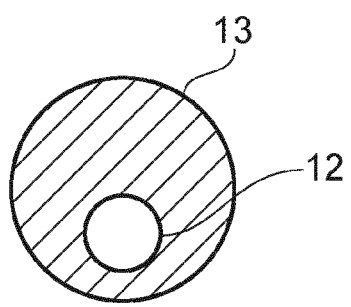
FIG. 5 shows a central or inner tube which is not concentric with an outer tube.

FIG. 5 shows a still further example arrangement. Here, the central or inner tube 12 is not concentric with the outer tube 13. This allows the amount of phase changing material between the oil carrying inner tube 12 and outer tube 13 to be controlled and adjusted. If for example the top of the pipe shown in FIG. 5 is particularly hot then moving the inner tube so as to be non-concentric with the outer tube increases the thickness of the phase changing material thereby increasing the amount of energy that it may absorb on the 'hot' side of the circuit.

Figure 6:
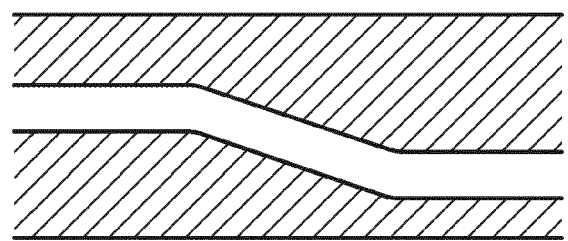
FIG. 6 shows how the concept shown in FIG. 5 may be adjusted along the length of all or part of the circuit.
Figure 7:
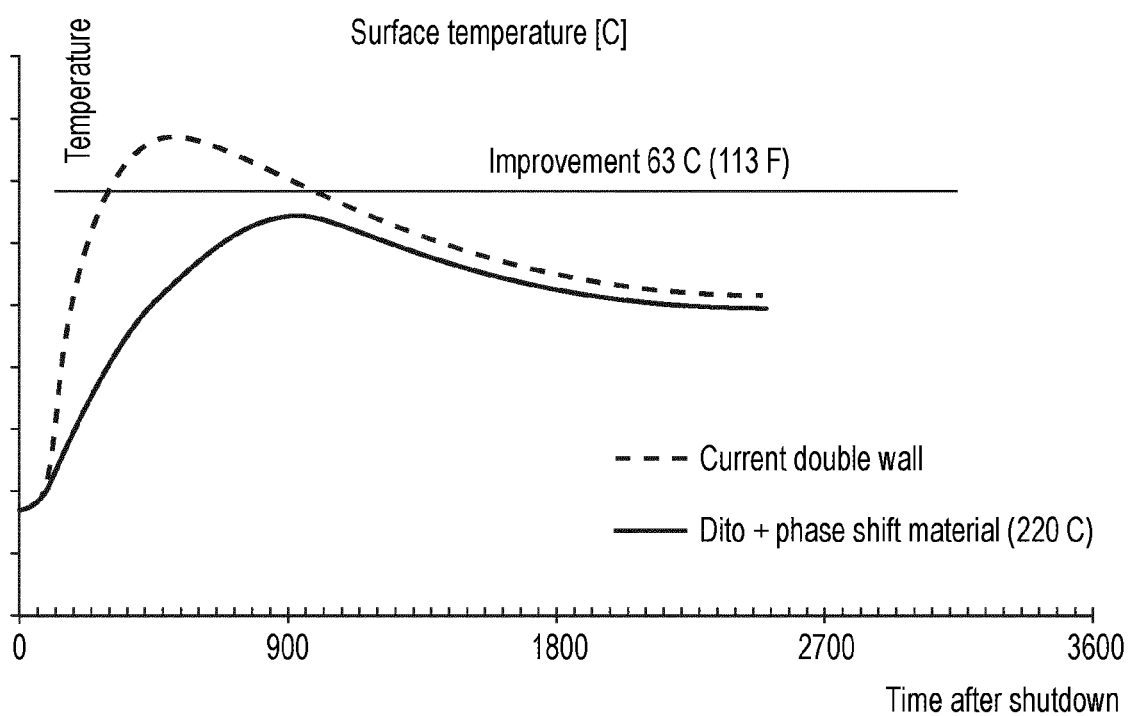
FIG. 7 shows a graph illustrating temperature versus time after engine shut-down illustrating the advantageous effect of the present disclosure.

FIG. 6 shows how the concept shown in FIG. 5 may be adjusted along the length of all or part of the circuit.

The combination of selecting the phase changing material and its thickness can advantageously be used to optimise the heat absorption capabilities of the system. Regions of excessive heat on engine shut-down can thus be provided with section of greater phase changing material thickness to absorb higher energy and prevent coking within the inner tube.

The conduit may be formed of a plurality of sections which maybe be manufactured in a conventional manner or formed using 3D additive manufacturing techniques.

The invention claimed is:

1. An aircraft engine circulation system, comprising:
a conduit arranged to communicate a lubricant to and from one or more bearings, said conduit comprising a central tube defining a passage for communicating lubricant and a peripheral tube surrounding the central tube and defining a space between the outer surface of the central tube and an inner surface of the peripheral tube, wherein the space includes a thermally induced phase changing material arranged to change phase when heated; and
a heat exchanger arranged to receive lubricant from the central tube.

2. The system of claim 1, wherein the phase changing material is selected so as to change phase from a solid above a predetermined engine temperature.

3. The system of claim 2, wherein the phase changing material is selected to return to a solid phase below a predetermined engine temperature.

4. The system of claim 1, wherein the phase changing material is arranged to change or begin to change phase between 180 degrees C. and 250 degrees C.

5. The system of claim 1, wherein the phase changing material is arranged to change phase between 200 degrees C. and 250 degrees C.

6. The system of claim 1, wherein the phase changing material is arranged to change phase at 225 degrees C.

7. The system of claim 1, wherein the phase changing material is a salt selected from the group of organic or inorganic salts.

8. The system of claim 7, wherein the phase changing material is an H220 molten salt or an H105 salt.

9. The system of claim 1, wherein the phase changing material is a metal.

10. The system of claim 9, wherein the phase changing material is one of lithium, zinc, or lead, or an alloy of lithium, zinc, or lead.

11. The system of claim 10, wherein the phase changing material is an iron or iron containing alloy.

12. The system of claim 1, wherein the radial separation defined between the outer surface of the central tube and the inner surface of the peripheral tube is approximately constant.

13. The system of claim 12, wherein the radial separation of the outer surface of the central tube and the inner surface of the peripheral tube is between 0.5 millimeters and 1.5 millimeters.

14. The system of claim 1, wherein the radial separation of the outer surface of the central tube and the inner surface of the peripheral tube along the length of the conduit is non-uniform.

15. The system of claim 14, wherein the radial separation along the length of the conduit is selected according to a predetermined or predicted heating of the local region of the conduit.

16. The system of claim 15, wherein some regions of the conduit have a radial separation of zero millimeters.

17. The system of claim 1, wherein the tubes are at least one of (a) concentric and (b) having a same cross-sectional shape.

18. The system of claim 1, wherein the cross-sectional shape of the tubes is non-uniform along the length of the conduit.

19. The system of claim 1, wherein at least one of the radial spacing or concentricity of the central and peripheral tubes is selected according to a predicted or predetermined temperature of the tube in use along a specific length or the conduit during use.

* * * * *